(12) United States Patent
Yamauchi

(10) Patent No.: US 8,400,543 B2
(45) Date of Patent: Mar. 19, 2013

(54) IMAGING SYSTEM

(75) Inventor: Makiko Yamauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 866 days.

(21) Appl. No.: 12/185,579

(22) Filed: Aug. 4, 2008

(65) Prior Publication Data

US 2009/0040350 A1 Feb. 12, 2009

(30) Foreign Application Priority Data

Aug. 10, 2007 (JP) ................................ 2007-210295

(51) Int. Cl.
*H04N 3/14* (2006.01)
*H04N 5/335* (2006.01)

(52) U.S. Cl. .................... 348/305; 348/302; 348/303

(58) Field of Classification Search .................. 348/303, 348/305
See application file for complete search history.

(56) References Cited

U.S. PATENT DOCUMENTS

| 6,115,066 | A * | 9/2000 | Gowda et al. ............... 348/308 |
| 6,784,928 | B1 * | 8/2004 | Sakurai et al. ............. 348/220.1 |
| 7,417,667 | B2 * | 8/2008 | Shibutani ................... 348/220.1 |
| 7,471,327 | B2 * | 12/2008 | Hosier et al. ................ 348/303 |
| 7,619,669 | B2 * | 11/2009 | Barna et al. .................... 348/283 |
| 2003/0177500 | A1 * | 9/2003 | Nakamura et al. ............ 725/105 |
| 2007/0139544 | A1 * | 6/2007 | Egawa et al. ................. 348/308 |

FOREIGN PATENT DOCUMENTS

| JP | 2005-311487 | 11/2005 |
| JP | 2007-173950 A | 7/2007 |

OTHER PUBLICATIONS

The above references cited in a Dec. 22, 2011 Japanese Office Action, which is enclosed without an English Translation, that issued in Japanese Patent Application No. 2007-210295.

* cited by examiner

*Primary Examiner* — Sinh Tran
*Assistant Examiner* — Jason Flohre
(74) *Attorney, Agent, or Firm* — Cowan, Liebowitz & Latman, P.C.

(57) ABSTRACT

An imaging system comprises an image sensing apparatus including a pixel array, a row selection unit, and a readout unit; and a supply unit including a plurality of A/D converting units, and a transfer unit. The supply unit supplies a power supply voltage to an A/D converting unit which, of the plurality of A/D converting units, receives signals from the pixels in the pixel array by means of the transfer unit, and does not supply a power supply voltage to an A/D converting unit which, of the plurality of A/D converting units, receives no signals from the pixels in the pixel array by means of the transfer unit, in a 1-line period. The readout unit A/D-converts the signals from the pixels in the pixel array using the A/D converting unit supplied with the power supply voltage by the supply unit, and outputs a digital image signal.

8 Claims, 9 Drawing Sheets

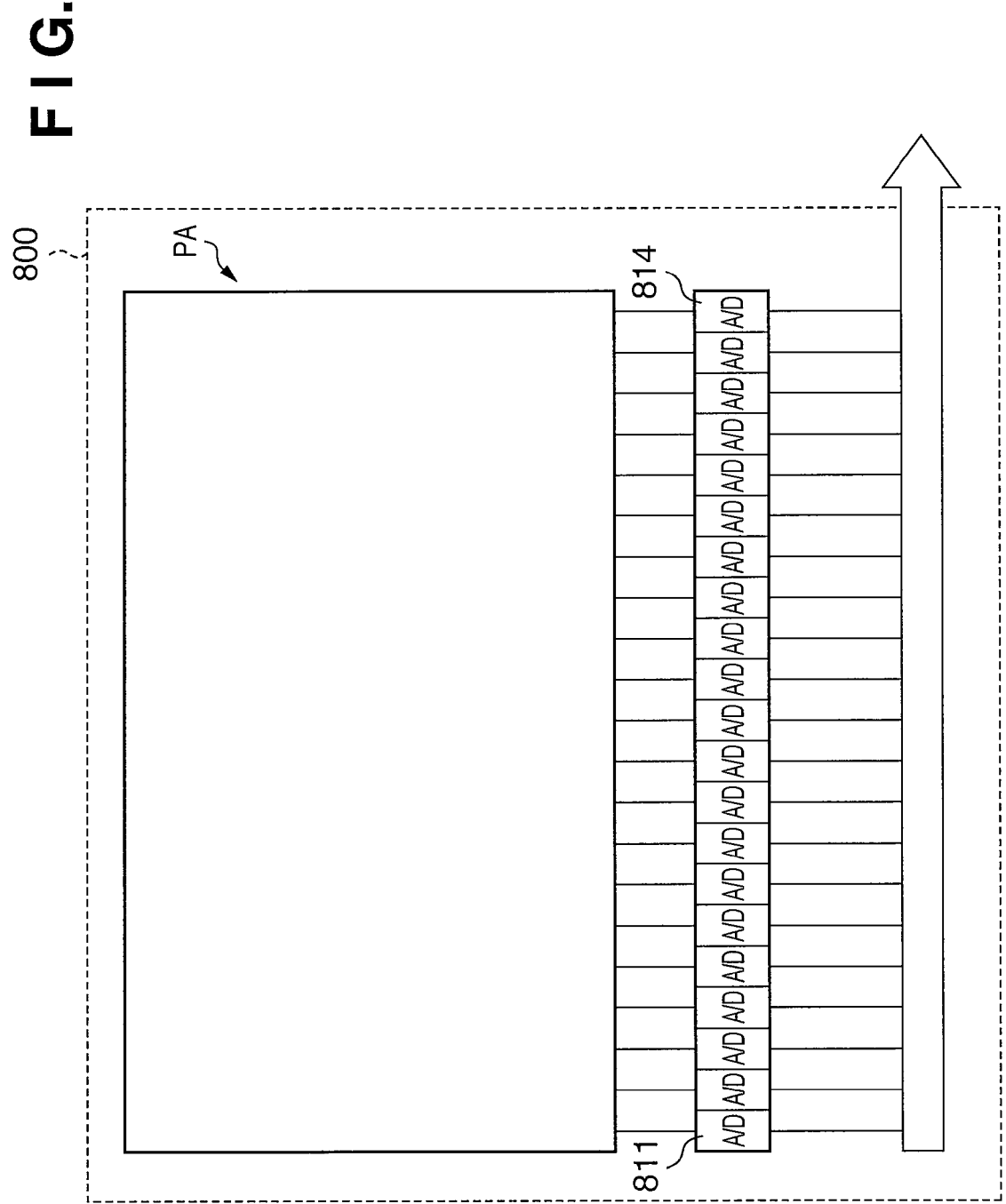

IMAGING SYSTEM

BACKGROUND OF THE INVENTION

1. Field of the Invention

The present invention relates to an imaging system.

2. Description of the Related Art

Along with the recent increase in the number of pixels of an image sensing apparatus in an image sensing system, demand for quick processing of acquired image signals is increasing. To meet this demand, there is proposed a technique of providing A/D converting units, which have conventionally been provided outside the image sensing apparatus, to the respective columns of the pixel array inside the image sensing apparatus. Such an image sensing apparatus is called a column AD type image sensing apparatus. The column AD type image sensing apparatus will be described in detail below with reference to the accompanying drawings.

As shown in FIG. 8, a conventional imaging system S1 comprises an image sensing apparatus 700, A/D converting unit 4, timing signal generating circuit 5, and signal processing unit 7.

The image sensing apparatus 700 photoelectrically converts an object image formed on its image sensing surface to generate an analog image signal, and supplies it to the A/D converting unit 4. The timing signal generating circuit 5 supplies timing signals to the A/D converting unit 4 and signal processing unit 7. The A/D converting unit 4 A/D-converts the analog signal to generate a digital image signal in synchronism with the timing signal, and supplies it to the signal processing unit 7. The signal processing unit 7 processes the digital image signal in synchronism with the timing signal, and outputs the processed digital image signal to the succeeding stage.

As shown in FIGS. 9 and 10, there is also proposed an imaging system S2 having a-column AD type image sensing apparatus 800 in which A/D converting units 811 to 814 are provided to the respective columns of a pixel array PA. The column AD type image sensing apparatus 800 can quickly read out pixel signals and easily perform arithmetic processing for the readout signals.

The A/D converting units 811 to 814 receive signals from the pixels of the respective columns of the pixel array PA.

The image sensing apparatus 800 shown in FIGS. 9 and 10 drives all of the plurality of A/D converting units 811 to 814. This increases power consumption for driving the plurality of A/D converting units 811 to 814, which may lead to heat generation by the plurality of A/D converting units 811 to 814. In this case, the characteristics of the image sensing apparatus 800 may degrade.

More specifically, the dark current of a photodiode, which is contained in each pixel of the pixel array PA in the image sensing apparatus 800, is generally said to double upon a temperature rise of 8° C. In addition, defects in a pixel signal attributed to the dark current of a photodiode and fixed pattern noise due to a variation in the dark current of the photodiode are widely known to exhibit a temperature characteristic that they increase along with a temperature rise.

That is, when the plurality of A/D converting units 811 to 814 generate heat, the number of defects in a pixel signal attributed to the dark current of each photodiode and fixed pattern noise due to a variation in the dark current of the photodiode increases. This may degrade the quality characteristics of an image corresponding to the image signal acquired by the image sensing apparatus 800.

SUMMARY OF THE INVENTION

The present invention provides an imaging system which can suppress heat generation by a plurality of A/D converting units.

According to one aspect of the present invention, there is provided an imaging system comprising: an image sensing apparatus configured to sense an object to acquire an image signal; and a supply unit configured to supply a power supply voltage to the image sensing apparatus, the image sensing apparatus including a pixel array in which a plurality of pixels are arrayed in a row direction and a column direction, a row selection unit configured to select one row in the pixel array, and a readout unit configured to read out and output signals from the pixels of at least some columns from the plurality of pixels of a row, which is selected by the row selection unit, in a 1-line period from when the row selection unit selects one row until the row selection unit selects the next row, the readout unit including a plurality of A/D converting units provided according to respective columns of the pixel array, and a transfer unit configured to transfer signals from the pixels of the respective columns of the pixel array to the plurality of A/D converting units, wherein the supply unit supplies a power supply voltage to an A/D converting unit which, of the plurality of A/D converting units, receives signals from the pixels in the pixel array by means of the transfer unit, and does not supply a power supply voltage to an A/D converting unit which, of the plurality of A/D converting units, receives no signals from the pixels in the pixel array by means of the transfer unit, in the 1-line period, and the readout unit A/D-converts the signals from the pixels in the pixel array using the A/D converting unit supplied with the power supply voltage by the supply unit, and outputs a digital image signal.

According to the present invention, it is possible to suppress heat generation by a plurality of A/D converting units.

Further features of the present invention will become apparent from the following description of exemplary embodiments with reference to the attached drawings.

BRIEF DESCRIPTION OF THE DRAWINGS

FIG. 10 is a view for explaining the second prior art.

DESCRIPTION OF THE EMBODIMENTS

Figure 1:
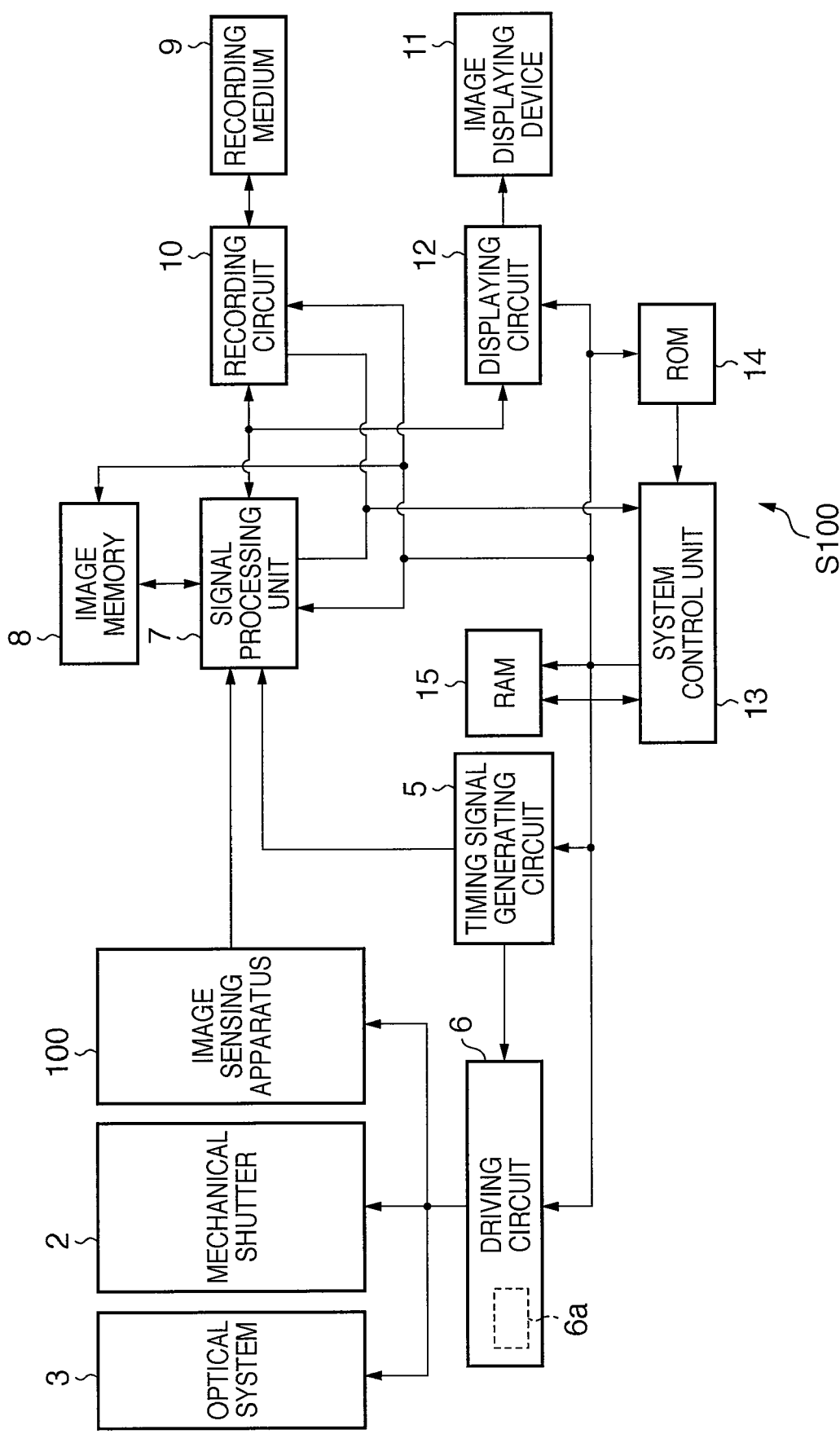
FIG. 1 is a block diagram showing the configuration of an imaging system S100 according to the first embodiment of the present invention.

An imaging system S100 according to the first embodiment of the present invention will be explained with reference to FIG. 1. FIG. 1 is a block diagram showing the configuration of the imaging system S100 according to the first embodiment of the present invention.

The imaging system S100 comprises an optical system 3, mechanical shutter 2, image sensing apparatus 100, timing signal generating circuit 5, driving circuit 6, signal processing unit 7, image memory 8, recording circuit 10, displaying circuit 12, and image displaying device 11. The imaging system S100 also comprises a system control unit 13, ROM 14, and RAM 15.

The optical system 3 includes a lens and stop. The optical system 3 forms an image having an appropriately set brightness on the image sensing surface of the image sensing apparatus 100.

The mechanical shutter 2 is inserted between the optical system 3 and the image sensing apparatus 100 in the optical path, and adjusts the amount of light guided to the image sensing apparatus 100 after passing through the optical system 3 (exposure time). When the image sensing apparatus 100 has an electronic shutter function, the required exposure time may be ensured by using both the mechanical shutter 2 and electronic shutter.

The image sensing apparatus 100 converts the object image formed on its image sensing surface (pixel array PA) into an analog image signal. The image sensing apparatus 100 reads out the analog signal from the pixel array PA, and A/D-converts the readout analog signal to generate a digital image signal. The image sensing apparatus 100 then outputs the digital image signal.

The timing signal generating circuit 5 supplies timing signals to the driving circuit 6 and signal processing unit 7. The driving circuit 6 and signal processing unit 7 operate in synchronism with the timing signals.

The driving circuit 6 drives the optical system 3, mechanical shutter 2, and image sensing apparatus 100 in synchronism with the timing signals. The driving circuit 6 includes a supply unit 6a (see FIG. 2). In a 1-line period, the supply unit 6a supplies a power supply voltage to an A/D converting unit, which, of a plurality of A/D converting units 111 to 114 (see FIG. 2), receives signals from the pixels in the pixel array PA (see FIG. 2) by means of signal transfer gates (to be described later). On the other hand, in the 1-line period, the supply unit 6a does not supply a power supply voltage to an A/D converting unit, which, of the plurality of A/D converting units 111 to 114 (see FIG. 2), receives no signals from the pixels in the pixel array PA by means of signal transfer gates (to be described later).

In synchronism with the timing signals, the signal processing unit 7 performs various types of arithmetic processing to generate image data such as correction for the digital image signal. The various kinds of arithmetic processing such as correction include, for example, image processing such as color conversion, white balance, and gamma correction, resolution conversion processing, and image compression processing. This image data is supplied to, for example, the image memory 8, displaying circuit 12, system control unit 13, and recording circuit 10. An example of the signal processing unit 7 is a signal processing circuit. The signal processing unit 7 outputs, to the system control unit 13, items of information on an image data generated in the process of the signal processing, for example, items of information such as the spatial frequency of an image, its average in a designated region, and the amount of data of a compressed image, as well as information extracted from these items of information. The signal processing unit 7 receives image data read out from a recording medium 9 by the recording circuit 10. If the received image data is a compressed image, the signal processing unit 7 decompresses the image data and supplies it to the image memory 8.

The signal processing unit 7 may output the image data without compressing it.

The image memory 8 is connected to the signal processing unit 7, and stores the image data output from the signal processing unit 7. The image memory 8 is used to temporarily store an image signal being processed, and store image data as a processed image signal.

The recording circuit 10 is an interface to connect the recording medium 9. The recording medium 9 is detachably connected to the recording circuit 10. With this arrangement, the image data output from the signal processing unit 7 is recorded on the recording medium 9 via the recording circuit 10. The recording circuit 10 converts the image data into data compatible with the recording medium 9 (e.g., hierarchical file system data), and records it on the recording medium 9. The recording circuit 10 outputs items of information such as the type and free space available in the recording medium 9 to the system control unit 13. The recording circuit 10 reads out the image data from the recording medium 9, and outputs it to the signal processing unit 7.

The displaying circuit 12 converts the image data output from the signal processing unit 7 into an analog signal for display, and supplies it to the image displaying device 11. An example of the analog signal for display is an analog signal based on the NTSC scheme.

On the basis of the analog signal, the image displaying device 11 displays an image corresponding to the image data. That is, the image displaying device 11 serves as an electronic viewfinder. An example of the image displaying device 11 is an LCD device.

The system control unit 13 systematically controls the imaging system S100.

For example, the system control unit 13 controls the image sensing apparatus 100 and signal processing unit 7 in the following way. If the frame rate of an image signal output from a readout unit (to be described later) of the image sensing apparatus 100 is greater than or equal to the threshold value, the system control unit 13 controls an adding unit (to be described later) of the image sensing apparatus 100 to add signals from the pixels of two or more columns. If the frame rate of the image signal output from the readout unit of the image sensing apparatus 100 is lower than the threshold value, the system control unit 13 controls not the adding unit of the image sensing apparatus 100 but the signal processing unit 7 to add signals from the pixels of two or more columns.

The ROM 14 is a nonvolatile memory which stores a program describing a control method to be executed by the system control unit 13, control data for, for example, parameters and tables used in executing the program, and correction data for, for example, defective pixel information.

The RAM 15 is a volatile memory which stores the program, control data, and correction data that are stored in and transferred by the ROM 14. The RAM 15 is used to control the imaging system by the system control unit 13.

Figure 2:
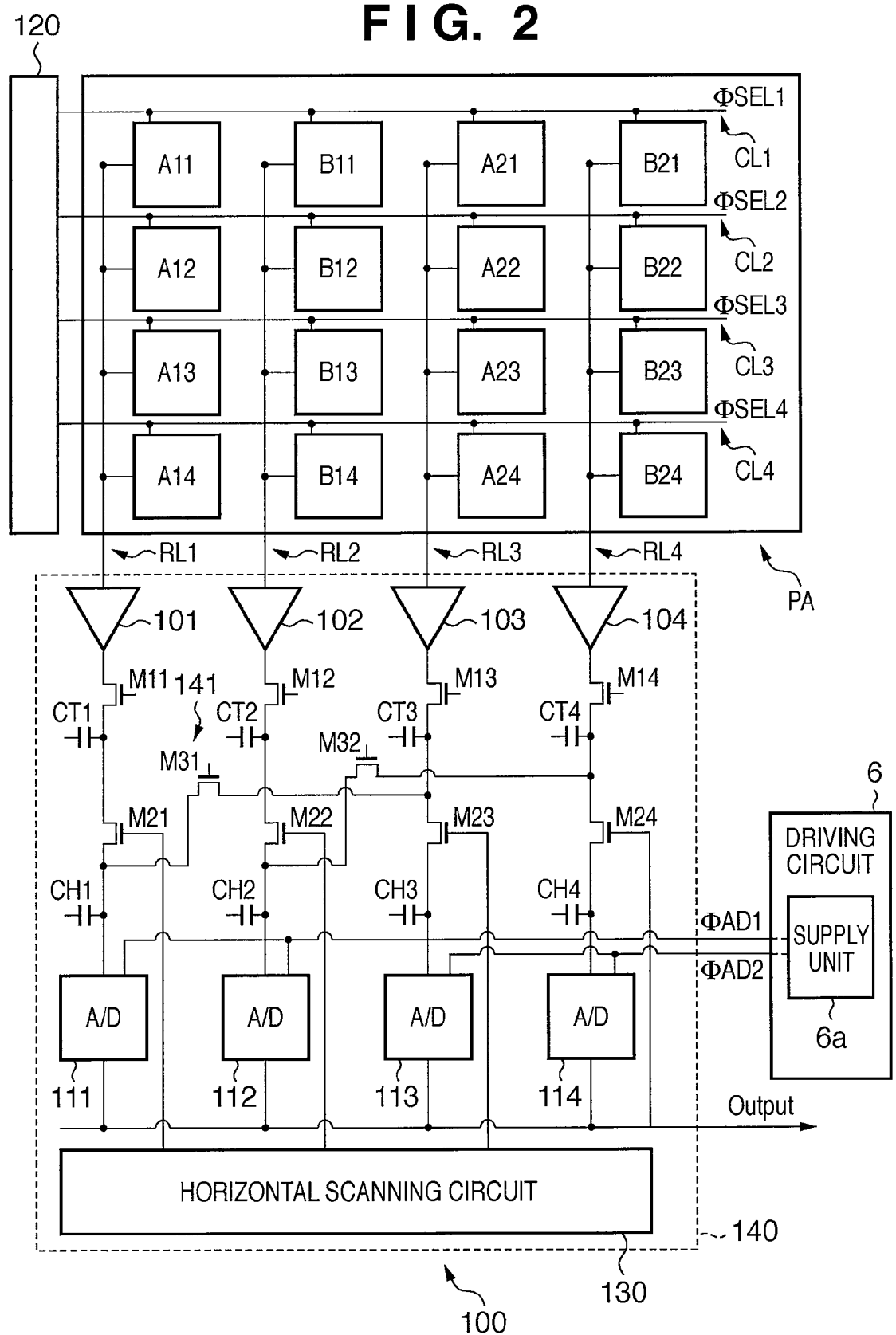
FIG. 2 is a circuit diagram showing the arrangement of an image sensing apparatus 100.

The arrangement of the image sensing apparatus 100 will be explained with reference to FIG. 2. FIG. 2 is a circuit diagram showing the arrangement of the image sensing apparatus 100.

The image sensing apparatus 100 includes the pixel array PA, a row selection unit 120, and a readout unit 140.

In the pixel array PA, a plurality of pixels A11 to B24 are arrayed in the row direction and the column direction. Each of the pixels A11 to B24 includes a photodiode (not shown).

The dark current of a photodiode is generally said to double upon a temperature rise of 8° C. In addition, defects in a pixel signal attributed to the dark current of a photodiode and fixed pattern noise due to a variation in the dark current of the photodiode exhibit a temperature characteristic that they increase along with a temperature rise.

FIG. 2 exemplifies a case in which the pixel array PA includes pixels A11 to B24 of four rows and four columns.

The row selection unit 120 selects one row in the pixel array PA. The row selection unit 120 supplies, for example, selection signals φSEL1 to φSEL4, for selecting the respective rows of the pixels A11 to B24 in the pixel array PA, to the pixels A11 to B24 via row selection lines CL1 to CL4. The row selection unit 120 sequentially activates the selection signals φSEL1 to φSEL4 to sequentially select the respective rows of the pixels A11 to B24 in the pixel array PA. An example of the row selection unit 120 is a vertical scanning circuit for scanning the pixel array PA in the vertical direction (in the column direction).

In a 1-line period from when the row selection unit 120 selects one row until it selects the next row, the readout unit 140 sequentially reads out and outputs signals from the pixels of respective columns of the row selected by the row selection unit 120.

More specifically, the readout unit 140 comprises preamplifiers 101 to 104, signal transfer gates M11 to M14, signal holding capacitances CT1 to CT4, signal transfer gates (transfer units) M21 to M24, and signal holding capacitances CH1 to CH4. The readout unit 140 also comprises an adding unit 141, the plurality of A/D converting units 111 to 114, and a horizontal scanning circuit 130.

The preamplifiers 101 to 104 are connected to the pixels A11 to B24 of the respective columns of the pixel array PA via column signal lines RL1 to RL4. The preamplifiers 101 to 104 amplify signals from the pixels A11 to B24, which are transmitted via the column signal lines RL1 to RL4.

The signal transfer gates M11 to M14 are switches for transferring the signals amplified by the preamplifiers 101 to 104 to the signal holding capacitances CT1 to CT4. An example of each of the signal transfer gates M11 to M14 is a MOS transistor. The signal transfer gates M11 to M14 are turned on when their gates are supplied with active signals, and transfer the signals to the signal holding capacitances CT1 to CT4.

The signal holding capacitances CT1 to CT4 temporarily hold the transferred signals.

The signal transfer gates M21 to M24 are switches for transferring the signals held in the signal holding capacitances CT1 to CT4 to the signal holding capacitances CH1 to CH4. That is, the signal transfer gates M21 to M24 transfer the signals from the respective columns of the pixel array to the A/D converting units 111 to 114 via the signal holding capacitances CH1 to CH4.

The signal holding capacitances CH1 to CH4 temporarily hold the transferred signals.

The adding unit 141 is interposed between the pixel array PA and the plurality of A/D converting units 111 to 114, and adds signals from the pixels A11 to B24 of two or more columns in the pixel array PA. More specifically, the adding unit 141 includes horizontal adding gates M31 and M32. An example of the horizontal adding gate M31 is a MOS transistor. The horizontal adding gate M31 transfers the signal held in the signal holding capacitance CT3 to the signal holding capacitance CH1 when its gate is supplied with an active signal. The horizontal adding gate M31 adds the signals held in the signal holding capacitances CT1 and CT3, and controls the signal holding capacitance CH1 to hold the sum signal. An example of the horizontal adding gate M32 is a MOS transistor. The horizontal adding gate M32 transfers the signal held in the signal holding capacitance CT4 to the signal holding capacitance CH2 when its gate is supplied with an active signal. The horizontal adding gate M32 adds the signals held in the signal holding capacitances CT2 and CT4, and controls the signal holding capacitance CH2 to hold the sum signal.

The plurality of A/D converting units 111 to 114 are provided to the respective columns of the pixel array PA. The A/D converting units 111 to 114 A/D-convert the signals (analog signals) held in the signal holding capacitances CH1 to CH4 to generate digital signals. The A/D converting units 111 to 114 output these digital signals to the signal processing unit 7 (see FIG. 1).

In the 1-line period, the supply unit 6a supplies a power supply voltage φAD1 to an A/D converting unit, which receives signals from the pixels in the pixel array, of the plurality of A/D converting units 111 to 114. On the other hand, in the 1-line period, the supply unit 6a does not supply a power supply voltage φAD2 to an A/D converting unit, which receives no signals from the pixels in the pixel array PA, of the plurality of A/D converting units 111 to 114.

The horizontal scanning circuit 130 sequentially supplies active signals to the signal transfer gates M21 to M24, and sequentially transfers the signals held in the signal holding capacitances CT1 to CT4 to the signal holding capacitances CH1 to CH4.

In this manner, the readout unit 140 A/D-converts signals from the pixels in the pixel array PA using A/D converting units supplied with a power supply voltage from the supply unit 6a, and outputs a digital image signal.

Figure 3:
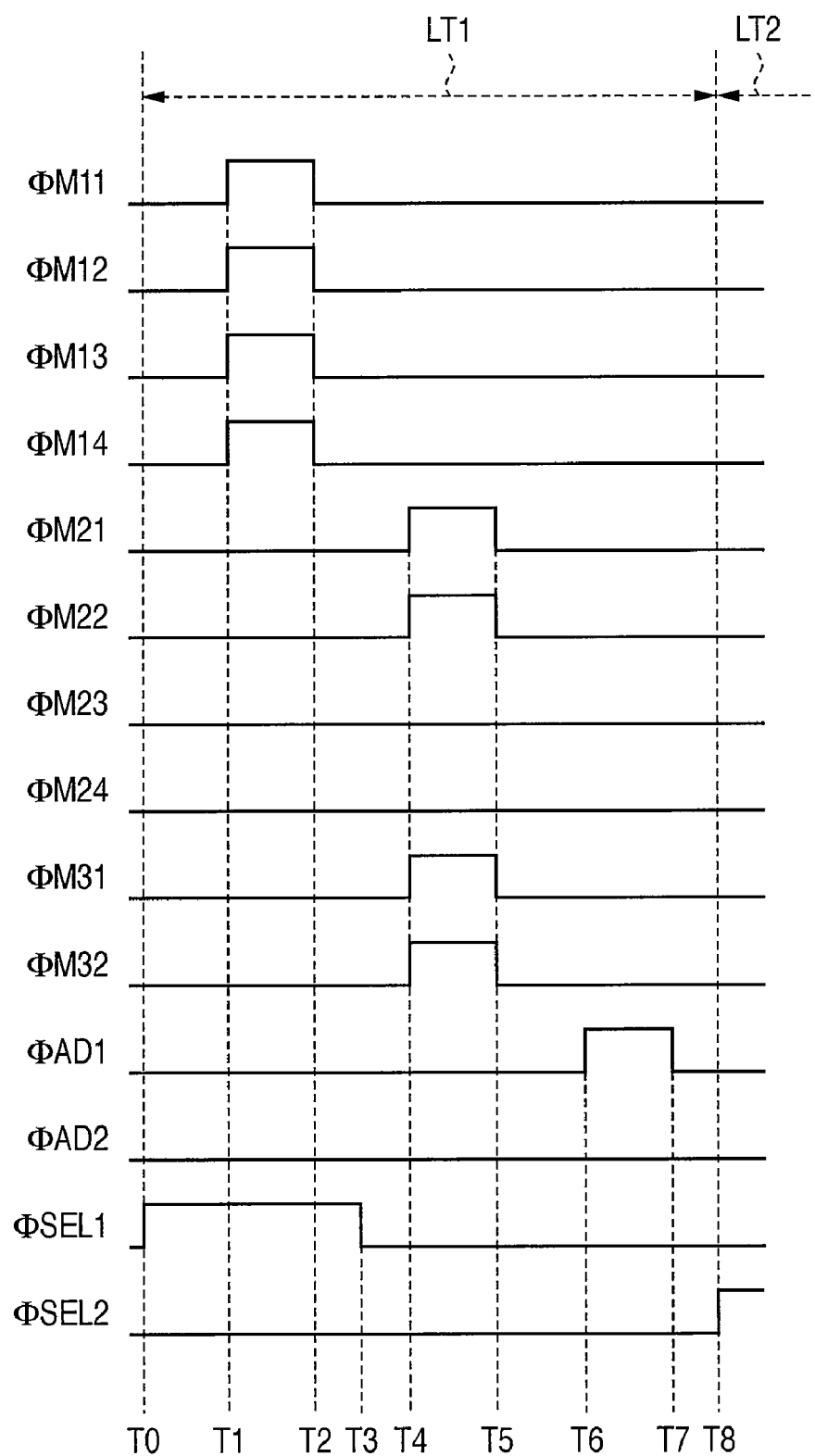
FIG. 3 is a timing chart showing a timing waveform representing the operation of the image sensing apparatus 100.

The operation of the image sensing apparatus 100 will be explained next with reference to FIG. 3. FIG. 3 is a timing chart showing a timing waveform representing the operation of the image sensing apparatus 100.

At timing T0, the row selection unit 120 supplies an active selection signal φSEL1 to the pixel array PA, and selects the pixels A11, B11, A21, and B21 of the row of the pixel A11. From this timing, a 1-line period LT1 starts.

At timing T1, signals φM11 to φM14 supplied to the signal transfer gates M11 to M14 change to active. Signals amplified by the preamplifiers 101 to 104 are transferred to the signal holding capacitances CT1 to CT4.

At timing T2, the signals φM11 to φM14 change to non-active. The transfer of signals amplified by the preamplifiers 101 to 104 to the signal holding capacitances CT1 to CT4 is thus completed. The signal holding capacitances CT1 to CT4 hold the transferred signals.

At timing T3, the row selection unit 120 changes the selection signal φSEL1 from active level to non-active level, and completes the selection of the row of the pixel A11.

At timing T4, signals φM21 and φM22 supplied to the signal transfer gates M21 and M22 change to active. Signals φM31 and φM32 supplied to the horizontal adding gates M31 and M32 of the adding unit 141 also change to active. The signals held in the signal holding capacitances CT1 and CT3 are added, and the sum signal is held in the signal holding capacitance CH1. The signals held in the signal holding capacitances CT2 and CT4 are added, and the sum signal is held in the signal holding capacitance CH2. Consequently, a signal obtained by adding signals from the columns of the pixels A11 to A14 and A21 to A24 is input to the A/D converting unit 111. A signal obtained by adding signals from the columns of the pixels B11 to B14 and B21 to B24 is input to the A/D converting unit 112.

Signals φM23 and φM24 supplied to the signal transfer gates M23 and M24 remain non-active. That is, no signals are transferred to the signal holding capacitances CH3 and CH4, and therefore no signals from the pixels in the pixel array PA are input to the A/D converting units 113 and 114.

At timing T5, the signals φM21, φM22, φM31, and φM32 change to non-active. The transfer of signals to the signal holding capacitances CH1 and CH2 is thus completed. The signal holding capacitances CH1 and CH2 hold the transferred signals.

At timing T6, the supply unit 6a supplies a power supply voltage φAD1 to the A/D converting units 111 and 112, which, of the plurality of A/D converting units 111 to 114, receive signals from the pixels in the pixel array PA. That is, the supply unit 6a supplies an active signal φAD1 to the A/D converting units 111 and 112 as a power supply voltage. The A/D converting units 111 and 112 A/D-convert the signals held in the signal holding capacitances CH1 and CH2, and output the converted signals. On the other hand, the supply unit 6a does not supply a power supply voltage φAD2 to the A/D converting units 113 and 114, which, of the plurality of A/D converting units 111 to 114, receive no signals from the pixels in the pixel array PA. That is, the supply unit 6a keeps a signal φAD2 non-active.

At timing T7, the supply unit 6a changes the signal φAD1 from active level to non-active level. The supply unit 6a thus completes the supply of a power supply voltage to the A/D converting units 111 and 112.

At timing T8, the row selection unit 120 supplies an active selection signal φSEL2 to the pixel array PA, and selects the pixels A12, B12, A22, and B22 of the row of the pixel A12. The 1-line period LT1 thus ends, and the next 1-line period LT2 starts.

According to this embodiment, it is possible to reduce power for driving the plurality of A/D converting units 111 to 114 because the unused A/D converting units 113 and 114 are stopped. This makes it possible to suppress heat generation by the plurality of A/D converting units 111 to 114. It is therefore possible to suppress degradation in the characteristics of the image sensing apparatus 100.

For example, the suppression of heat generation by the plurality of A/D converting units 111 to 114 allows a reduction in the dark currents of the photodiodes, which are contained in the pixels A11 to B24 in the pixel array PA. This makes it possible to reduce the number of defects in a pixel signal attributed to the dark current of each photodiode and fixed pattern noise due to variations in the dark current of the photodiode. It is therefore possible to suppress degradation in the quality of an image corresponding to an image signal acquired by the image sensing apparatus 100.

The number of pixels of the image sensing apparatus is increasing in recent years. As the number of pixels of an image sensing apparatus increases, the power saving effect according to this embodiment becomes greater. When the image sensing apparatus continues being driven at a high speed for a long period of time (i.e., when an output signal is acquired at a frame rate greater than or equal to the threshold value) as in a case in which a moving image is sensed, its temperature rise is especially significant. For this reason, the effect of preventing degradation in image quality according to this embodiment is great.

As has been described above, according to this embodiment, it is possible to obtain an image with a good quality even when the image sensing apparatus is continuously driven at a high speed (when an image signal is acquired at a frame rate greater than or equal to the threshold value) as in a case in which a moving image is sensed.

Still better, the reduction of the power consumption of the image sensing apparatus prolongs the life of the power supply unit (e.g., a battery) of the imaging system. This allows, for example, the driving of the imaging system for a longer time, and an increase in the number of times that it can sense an image.

Figure 4:
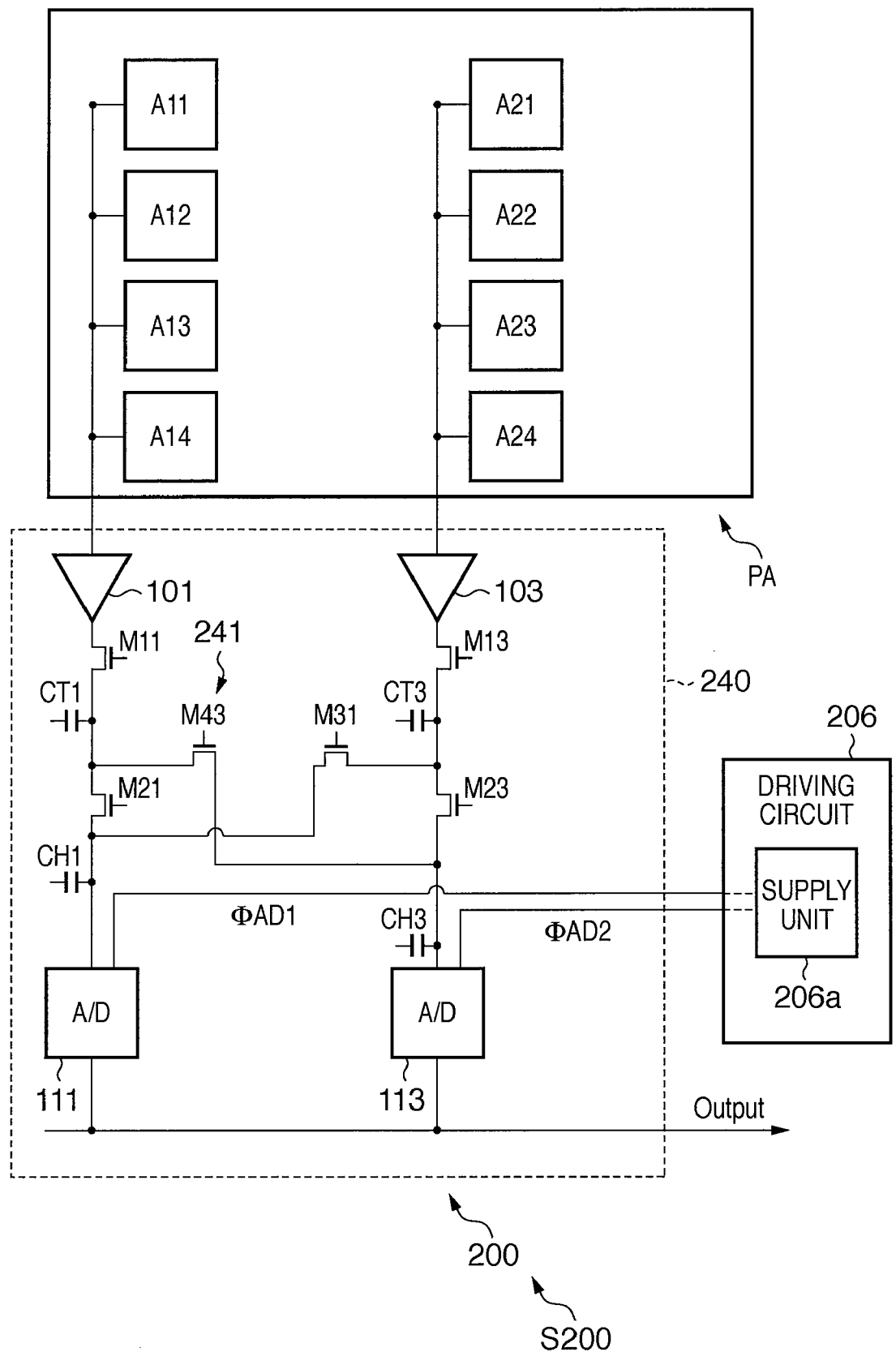
FIG. 4 is a circuit diagram showing the arrangement of an imaging system S200 according to the second embodiment of the present invention.

An imaging system S200 according to the second embodiment of the present invention will be explained next with reference to FIG. 4. FIG. 4 is a circuit diagram showing the arrangement of the imaging system S200 according to the second embodiment of the present invention. Parts unnecessary for a description are not illustrated in FIG. 4. Mainly, parts different from those in the first embodiment will be described, and a description of the same parts will not be given. Operations associated with the columns of pixels B11 to B14 and B21 to B24 in a pixel array PA are the same as those associated with the columns of pixels A11 to A14 and A21 to A24, respectively, and a description thereof will not be given.

The imaging system S200 is different from the imaging system S100 in the first embodiment in that it has an image sensing apparatus 200 and driving circuit 206, as shown in FIG. 4.

Figure 5:
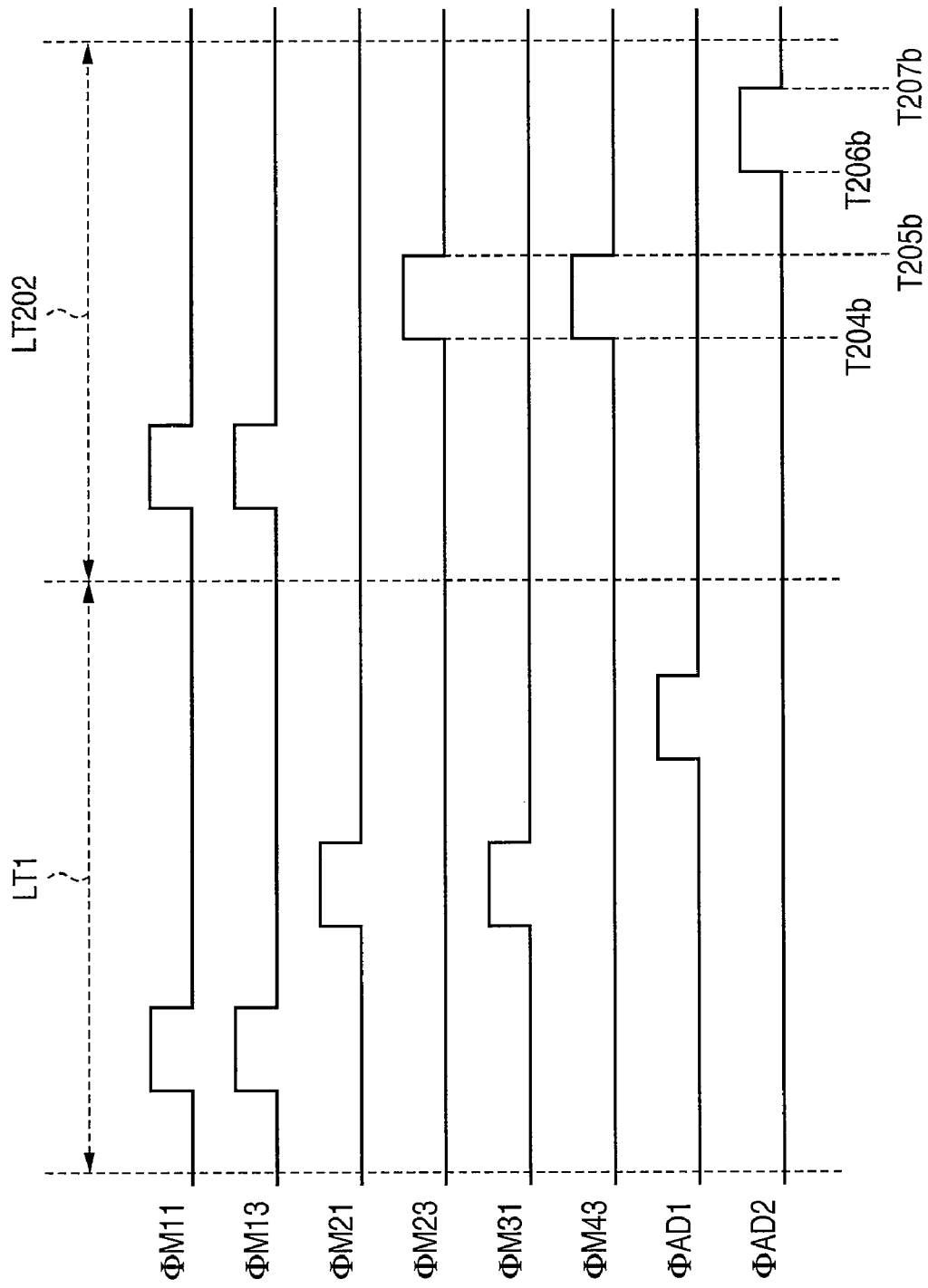
FIG. 5 is a timing chart showing a timing waveform representing the operation of an image sensing apparatus 200.

The image sensing apparatus 200 includes a readout unit 240. The readout unit 240 includes an adding unit 241. The adding unit 241 includes a horizontal adding gate M43, in addition to a horizontal adding gate M31. The horizontal adding gates M31 and M43 are alternately turned on for respective 1-line periods LT1 and LT202, as shown in FIG. 5. FIG. 5 is a timing chart showing a timing waveform representing the operation of the image sensing apparatus 200. As shown in FIG. 5, the image sensing apparatus 200 alternately repeats operations corresponding to the 1-line periods LT1 and LT202.

The driving circuit 206 includes a supply unit 206a. The supply unit 206a alternately supplies power supply voltages φAD1 and φAD2 to A/D converting units 111 and 113 for the respective 1-line periods LT1 and LT202, as shown in FIG. 5. That is, an A/D converting unit which is supplied with a power supply voltage by the supply unit 206a, and that which is not supplied with a power supply voltage by the supply unit 206a, change for the respective 1-line periods LT1 and LT202.

More specifically, as shown in FIG. 5, the operation of the image sensing apparatus 200 is different from that of the image sensing apparatus 100 in the first embodiment in the following points.

At timing T204b in the 1-line period LT202 subsequent to the 1-line period LT1, a signal DM23 supplied to a signal transfer gate M23 changes to active. A signal φM43 supplied to the horizontal adding gate M43 of the adding unit 241 also changes to active. Signals held in signal holding capacitances CT1 and CT3 are added, and the sum signal is held in a signal holding capacitance CH3. Consequently, a signal obtained by adding signals from the columns of the pixels A11 to A14 and A21 to A24 is input to the A/D converting unit 113.

A signal φM21 supplied to a signal transfer gate M21 remains non-active. That is, no signal is transferred to a signal holding capacitance CH1, and therefore no signals from the pixels in the pixel array PA are input to the A/D converting unit 111.

At timing T205b, the signal φM23 and a signal φM43 change to non-active. The transfer of a signal to the signal holding capacitance CH3 is thus completed. The signal holding capacitance CH3 holds the transferred signal.

At timing T206b, the supply unit 206a supplies a power supply voltage φAD2 to the A/D converting unit 113, which, of the plurality of A/D converting units 111 to 114, receives signals from the pixels in the pixel array PA. That is, the supply unit 6a supplies an active signal φAD2 to the A/D converting unit 113 as a power supply voltage. The A/D converting unit 113 A/D-converts the signal held in the signal holding capacitance CH3, and outputs the converted signal. On the other hand, the supply unit 206a does not supply a power supply voltage φAD1 to the A/D converting unit 111, which, of the plurality of A/D converting units 111 to 114, receives no signals from the pixels in the pixel array PA. That is, the supply unit 206a keeps a signal φAD1 non-active.

At timing T207b, the supply unit 206a changes the signal φAD2 from active level to non-active level. The supply unit 206a thus completes the supply of a power supply voltage to the A/D converting unit 113.

An A/D converting unit which is supplied with a power supply voltage by the supply unit 206a, and that which is not supplied with a power supply voltage by the supply unit 206a, may change for each frame period including a plurality of 1-line periods (four 1-line periods in FIG. 4).

Figure 6:
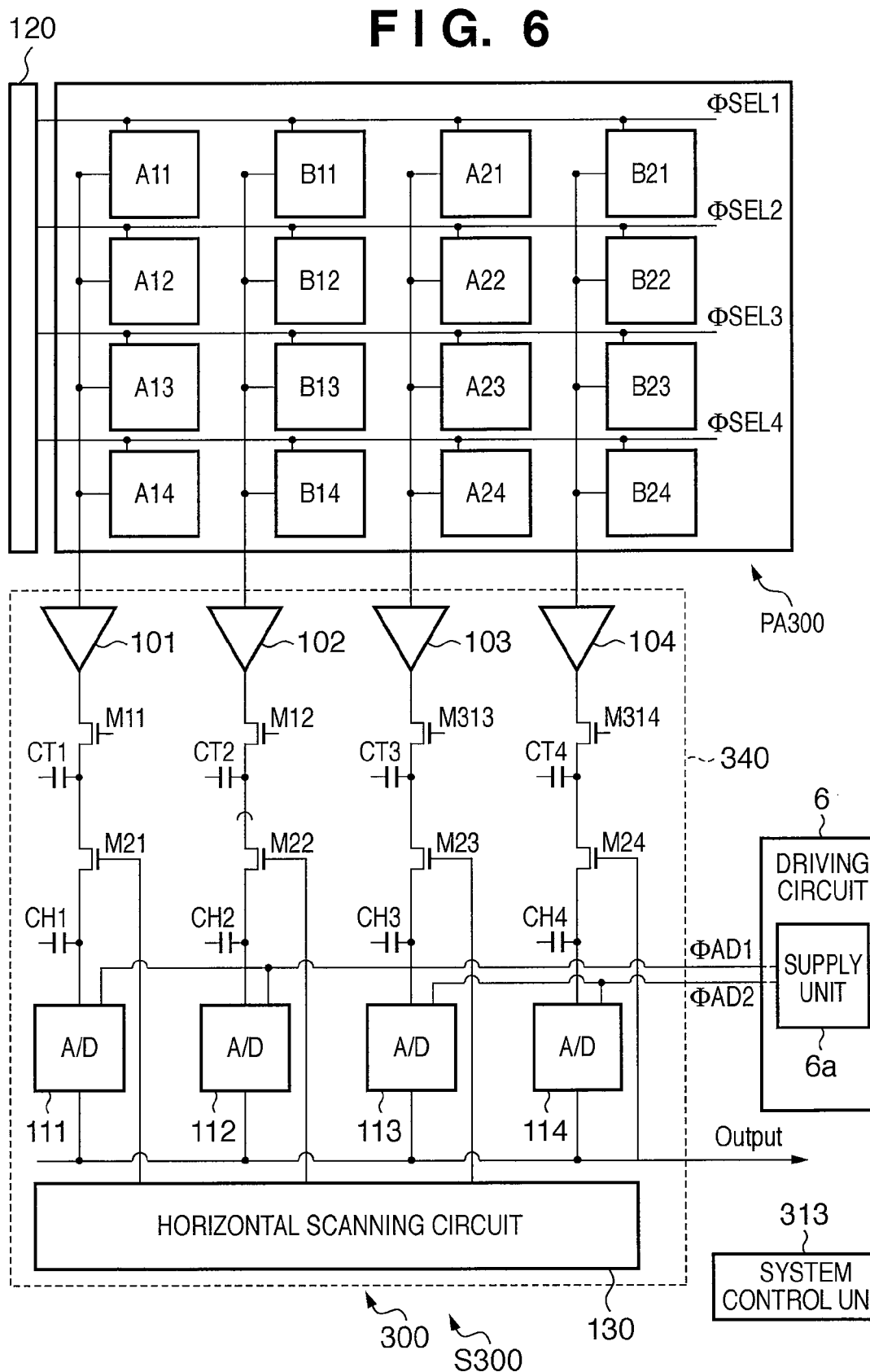
FIG. 6 is a circuit diagram showing the arrangement of an imaging system S300 according to the third embodiment of the present invention.

An imaging system S300 according to the third embodiment of the present invention will be explained next with reference to FIG. 6. FIG. 6 is a circuit diagram showing the arrangement of the imaging system S300 according to the third embodiment of the present invention. Parts unnecessary for a description are not illustrated in FIG. 6. Mainly, parts different from those in the first embodiment will be described, and a description of the same parts will not be given. Operations associated with the columns of pixels B11 to B14 and B21 to B24 in a pixel array PA are the same as those associated with the columns of pixels A11 to A14 and A21 to A24, respectively, and a description thereof will not be given.

The imaging system S300 is different from the imaging system S100 in the first embodiment in that it has an image sensing apparatus 300 and system control unit 313, as shown in FIG. 6.

The image sensing apparatus 300 includes a pixel array PA300 and readout unit 340.

The pixel array PA300 includes readout columns (first columns) A11 to A14 and B11 to B14 in which signals are read out from pixels, and non-readout columns (second columns) A21 to A24 and B21 to B24 in which no signals are read out from pixels in a first readout mode. An example of the first readout mode is a sub-sampling readout mode. Signals are read out from the pixels A11 to B24 of all columns in the pixel array PA300 in a second readout mode. An example of the second readout mode is a normal mode.

The readout unit 340 includes signal transfer gates M313 and M314. The signal transfer gates M313 and M314 are not turned on in a 1-line period LT301 in the first readout mode. That is, in the first readout mode, the readout unit 340 reads out signals from the pixels of the readout columns in the pixel array PA, and reads out no signals from the pixels of the non-readout columns in the pixel array PA. At this time, the readout unit 340 reads out and outputs signals from the pixels of some columns (readout columns) from the plurality of pixels of a row selected by the row selection unit 120. In the second readout mode, the readout unit 340 reads out signals from the pixels of all columns in the pixel array PA. At this time, the readout unit 340 reads out and outputs signals from the pixels of all columns from the plurality of pixels of a row selected by the row selection unit 120.

The system control unit 313 controls the image sensing apparatus 300 and a signal processing unit 7 to switch between the first readout mode and the second readout mode in accordance with predetermined conditions.

For example, the system control unit 313 controls the image sensing apparatus 300 and signal processing unit 7 in the following way. If the frame rate of an image signal read out by the readout unit 340 of the image sensing apparatus 300 is greater than or equal to the threshold value, the system control unit 313 controls the image sensing apparatus 300 to operate in the first readout mode so as not to read out signals from the pixels of the non-readout columns. If the frame rate of an image signal read out by the readout unit 340 is lower than the threshold value, the system control unit 313 controls the image sensing apparatus 300 to operate in the second readout mode so as to read out signals from the pixels of all columns, and controls the signal processing unit 7 to invalidate signals from the pixels of the non-readout columns.

Figure 7:
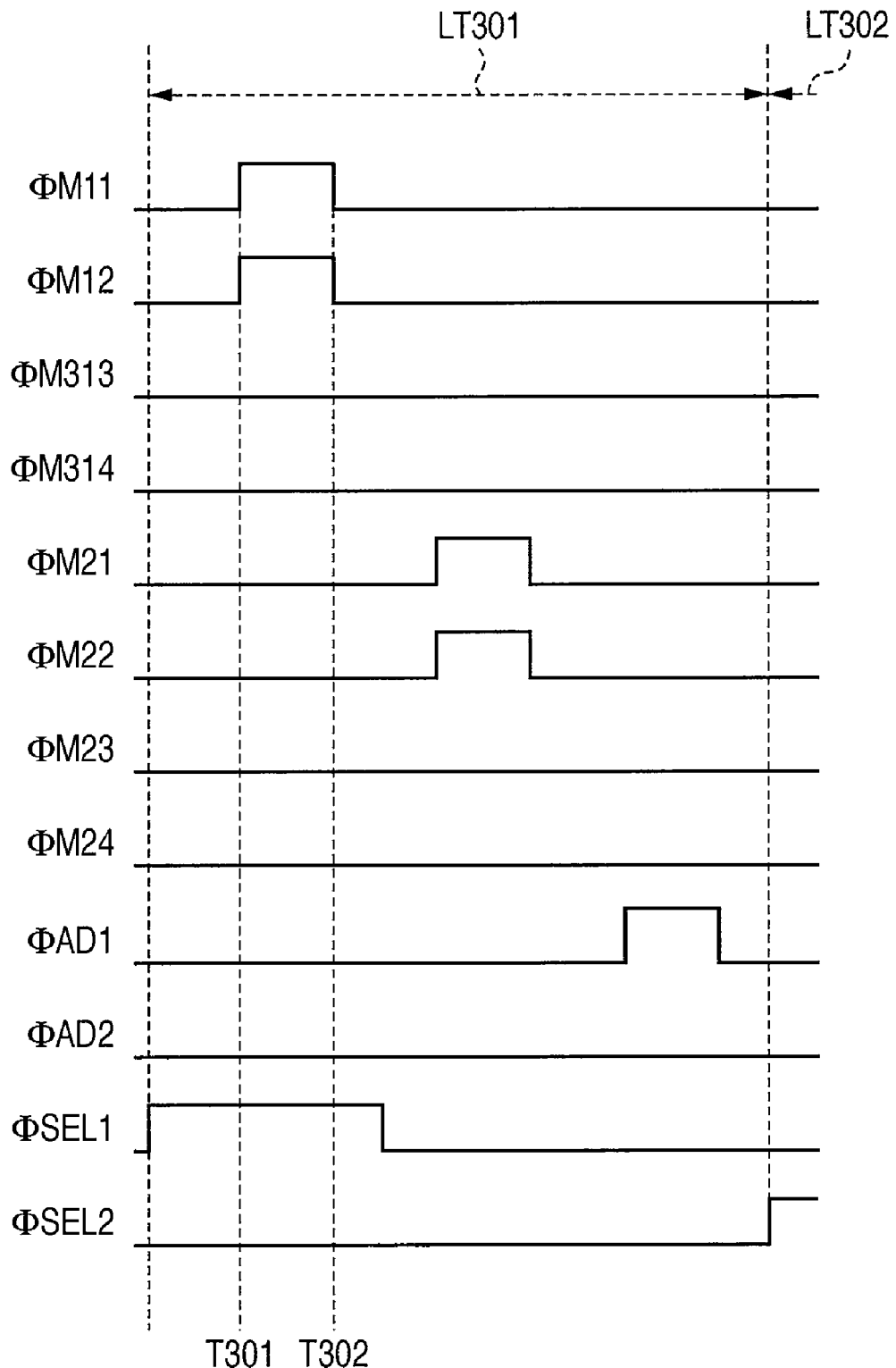
FIG. 7 is a timing chart showing a timing waveform representing the operation of an image sensing apparatus 300.
Figure 8:
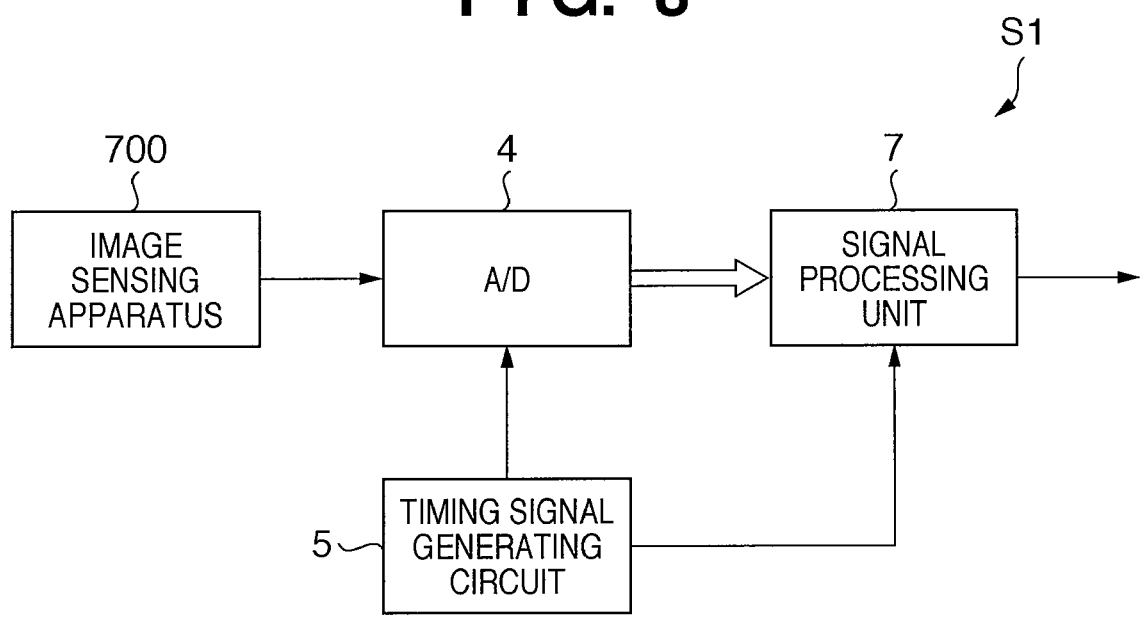
FIG. 8 is a block diagram for explaining a prior art.
Figure 9:
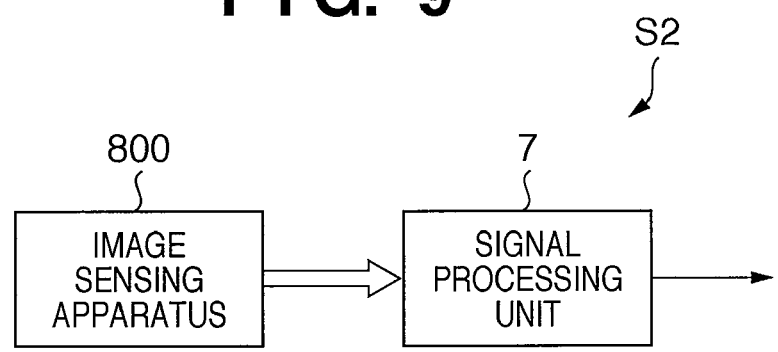
FIG. 9 is a block diagram for explaining another prior art.

More specifically, as shown in FIG. 7, the operation of the image sensing apparatus 300 is different from that of the image sensing apparatus 100 in the first embodiment in the following points. FIG. 7 is a timing chart showing a timing waveform representing the operation of the image sensing apparatus 300.

At timing T301, signals φM11 and φM12 supplied to signal transfer gates M11 and M12 change to active. Signals amplified by preamplifiers 101 and 102 are transferred to signal holding capacitances CT1 and CT2. On the other hand, signals φM313 and φM314 supplied to the signal transfer gates M313 and M314 remain non-active.

At timing T302, the signals φM11 and φM12 change to non-active. The transfer of signals amplified by the preamplifiers 101 and 102 to the signal holding capacitances CT1 and CT2 is thus completed. The signal holding capacitances CT1 and CT2 hold the transferred signals.

The pixel array PA300 may include readout rows (A11, B11) and (A13, B13) in which signals are read out from pixels, and non-readout rows (A21, B21) and (A23, B23) in which no signals are read out from pixels in the first readout mode. That is, the pixel array PA300 may be sub-sampled not only every column but also every row in the first readout mode.

Another modification will be explained next. The imaging system uses image sensing modes, that is, a still image mode and moving image mode. The still image mode includes a mode of recording sensed raw information (to be referred to as a RAW image hereinafter), a mode of recording an image for appreciation (to be referred to as a JPG image hereinafter) generated from a RAW image, and a mode of recording both RAW and JPG images. A JPG image is recorded in a large size defined by the image sensing resolution, or a small size defined by a resolution decreased by a certain data amount.

In the RAW recording mode, it is necessary to read out signals corresponding to all pixels from the pixel array of the image sensing apparatus. In the mode of recording both RAW and JPG images, it is necessary to add RAW pixel signals by, for example, digital addition to generate a JPG image having the small size. In these cases, to read out all pixel signals from the image sensing apparatus, the A/D converting units of all columns are used, and the signal processing unit performs digital addition for the readout image signals. That is, in response to instructions to operate the imaging system in these modes from the user, the system control unit may control the image sensing apparatus to read out signals from all the pixels in the pixel array PA even if the frame rate of an output image signal is greater than or equal to the threshold value.

In response to instructions to operate the imaging system in modes other than the above-described modes, the system control unit may control the adding unit of the image sensing apparatus to add signals from the pixels of two or more columns irrespective of the frame rate. Alternatively, the system control unit may control the image sensing apparatus to operate in the second readout mode so as to read out signals from the pixels of all columns, and control the signal processing unit to invalidate signals from the pixels of non-readout columns. This makes it possible to decrease the number of pixels, that is, the amount of data contained in an image signal, thus allowing quick processing of the image signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-210295, filed Aug. 10, 2007, which is hereby incorporated by reference herein in its entirety.

What is claimed is:

1. An imaging system comprising:
an image sensing apparatus configured to sense an object to acquire an image signal; and
a supply unit configured to supply a power supply voltage to the image sensing apparatus,
the image sensing apparatus including
a pixel array in which a plurality of pixels are arrayed in a row direction and a column direction,
a row selection unit configured to select one row in the pixel array, and
a readout unit configured to read out and output signals from the pixels of at least some columns from the plurality of pixels of a row, which is selected by the row selection unit, in a 1-line period from when the row selection unit selects one row until the row selection unit selects the next row,
the readout unit including
a plurality of A/D converting units provided according to respective columns of the pixel array,
a transfer unit configured to transfer signals from the pixels of the respective columns of the pixel array to the plurality of A/D converting units,
an adding unit configured to add signals from the pixels of two or more columns in the pixel array,
a plurality of holding units which are arranged between the adding unit and the plurality of A/D converting units and are configured to temporarily hold signal from each column in the pixel array before the signal is converted to digital signal by the A/D converting unit, and
a transfer gate which is arranged for each column between the adding unit and the plurality of holding units and is configured to transfer signals of pixels of each column in the pixel array to the plurality of holding units respectively,
wherein the supply unit supplies a power supply voltage to an A/D converting unit which, of the plurality of A/D converting units, receives the sum signal obtained by the adding unit, and does not supply a power supply voltage to an A/D converting unit which, of the plurality of A/D converting units, does not receive the sum signal obtained by the adding unit, in the 1-line period,
wherein the readout unit A/D-converts the signals from the pixels in the pixel array using the A/D converting unit supplied with the power supply voltage by the supply unit, and outputs a digital image signal, and
wherein the transfer gate which is arranged in a column to which the A/D converting unit which receives the sum signal is arranged is turned on, and the transfer gate which is arranged in a column to which the A/D converting unit which does not receive the sum signal is arranged is not turned on.

2. The system according to claim 1, wherein
the readout unit reads out signals from the pixels of a first column in the pixel array, and reads out no signals from the pixels of a second column in the pixel array in a first readout mode, and
the supply unit supplies a power supply voltage to an A/D converting unit which, of the plurality of A/D converting units, is connected to the pixels of the first column, and does not supply a power supply voltage to an A/D converting unit which, of the plurality of A/D converting units, is connected to the pixels of the second column, in the 1-line period in the first readout mode.

3. The system according to claim 2, wherein
the readout unit reads out signals from the pixels of all columns in the pixel array in a second readout mode.

4. The system according to claim 1, wherein
the A/D converting unit which, of the plurality of A/D converting units, is supplied with the power supply voltage by the supply unit, and the A/D converting unit which, of the plurality of A/D converting units, is not supplied with the power supply voltage by the supply unit, change for each 1-line period.

5. The system according to claim 1, wherein
the A/D converting unit which, of the plurality of A/D converting units, is supplied with the power supply voltage by the supply unit, and the A/D converting unit which, of the plurality of A/D converting units, is not supplied with the power supply voltage by the supply unit, change for each frame period including a plurality of 1-line periods.

6. The system according to claim 1, further comprising:
an optical system configured to form an image of the object on an image sensing surface of the image sensing apparatus; and
a signal processing unit configured to process the digital image signal output from the image sensing apparatus to generate image data.

7. The system according to claim 3, further comprising:
an optical system configured to form an image of the object on an image sensing surface of the image sensing apparatus;
a signal processing unit configured to process the digital image signal output from the image sensing apparatus to generate image data; and
a control unit configured to control the image sensing apparatus and the signal processing unit so that the image sensing apparatus operates in the first readout mode so as not to read out signals from the pixels of the second column if a frame rate of the digital image signal output from the readout unit is not less than a threshold value, and so that the image sensing apparatus operates in the second readout mode so as to read out signals from the pixels of all columns and the signal processing unit invalidates signals from the pixels of the second column if the frame rate of the digital image signal output from the readout unit is less than the threshold value.

8. The system according to claim 1, further comprising:
a control unit configured to control the image sensing apparatus so that the adding unit adds signals from the pixels of two or more columns if a frame rate of the digital image signal output from the readout unit is not less than a threshold value, and so that not the adding unit but the signal processing unit adds signals from the pixels of two or more columns if the frame rate of the digital image signal output from the readout unit is less than the threshold value.

* * * * *